UNITED STATES PATENT OFFICE.

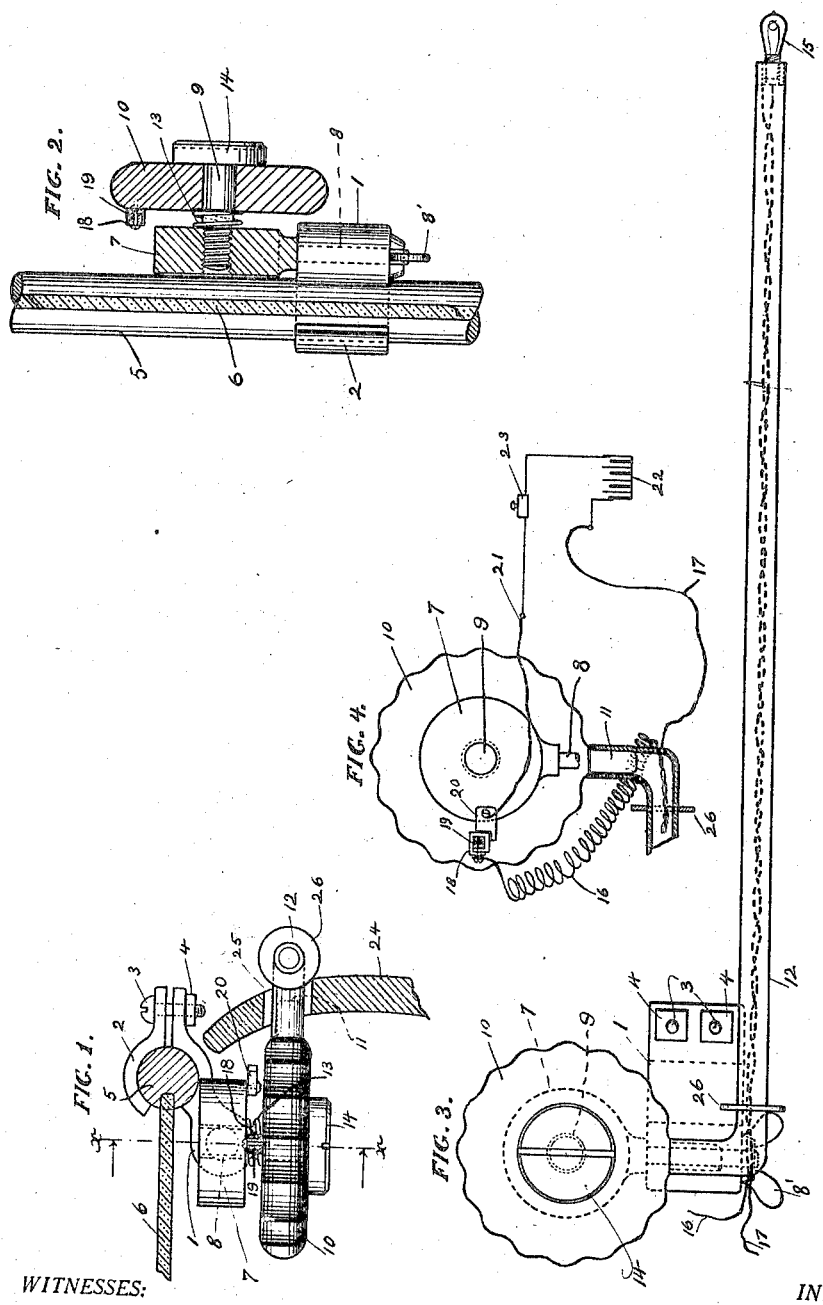

CARL O. KUEHNE, OF CHICAGO, ILLINOIS.

VEHICLE SIGNALING DEVICE.

1,283,809.

Specification of Letters Patent.

Patented Nov. 5, 1918.

Application filed December 26, 1916. Serial No. 138,868.

*To all whom it may concern:*

Be it known that I, CARL O. KUEHNE, a citizen of the United States, and a resident of the city of Chicago, county of Cook, and State of Illinois, have invented certain new and useful Improvements in Vehicle Signaling Devices, of which the following is a specification.

My invention relates to improvements in signaling devices designed for use particularly upon vehicles for signaling to others behind the intention of the driver or operator of the vehicle to turn or stop.

The object of my invention is the production of a device of the character mentioned which will be of durable and economical construction, one which may be readily and easily actuated in the signaling operation, one which will be effectual both in the day time and night time, and one which will be highly efficient when in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a horizontal section through one side of a wind shield and the adjoining side wall of a vehicle to which is applied a signaling device embodying the invention, the signaling arm of the device being shown in non-signaling position, Fig. 2 is a section taken substantially on line *x—x* of Fig. 1, Fig. 3 is a rear elevation of the device, detached, showing the signaling member in operative or signaling position, and Fig. 4 is a partially sectional front elevation of a portion of the construction shown in Fig. 3.

The preferred form of construction as illustrated in the drawings, comprises a clamp consisting of jaws 1 and 2 which are adjustably connected by screws 3 and co-operating nuts 4. Said clamp, when the device is in use, is adapted for rigid clamping engagement with one of the vertical side bars 5 of the wind shield 6 of the automobile upon which the device is employed.

The jaw 1 is formed, as clearly seen in Fig. 1, with an inwardly extending projection from which rises a supporting member 7 having a shank 8 at its under side which passes through a vertical opening in the member 1, said shank being securely fastened by means of a thumb nut 8' threaded thereon and which engages against the underside of said member 1, as clearly shown in Fig. 2.

Threaded in and projecting forwardly from the circularly formed upper end of member 7 is a stud 9 upon which is rotatably mounted a disk 10, said disk, as seen, having a knurled or corrugated periphery in order to facilitate engagement and rotation thereof by the hand. The disk 10 is provided at one side with a projecting lug 11 to which is rigidly secured an angular tubular arm 12, the arrangement being such that, through engagement and manipulation of member 10, the arm 12 may be rocked laterally with respect to the vehicle. Interposed between the members 7 and 10, as clearly shown in Fig. 2, is a helical compression spring 13 adapted to normally press the member 10 rearwardly into engagement with an enlarged head 14 provided at the end of stud 9, whereby said member 10 and hence arm 12 may be frictionally locked in positions of pivotal or rocking adjustment.

Carried at the outer end of the arm 12 is an electric lamp 15, the conductor wires 16 and 17 of which extend through the arm 12, the conductor wire 16 being connected with a contact 18 mounted upon a post 19 of insulating material carried upon the front side of disk 10. Secured to the member 7 is a contact 20 so arranged that, when the arm 12 is in horizontal or signaling position, as shown in Figs. 3 and 4, the contact 18 will engage therewith, as seen particularly in Fig. 4. Said contact 20 is connected by a conductor wire 21 with one side of a battery or other suitable source of electric energy 22, the other side of the latter being connected with a conductor wire 17. With this arrangement it will be seen that a circuit is completed through the lamp 15, which circuit will be controlled by the contacts 18 and 20, the arrangement being such that, when the signaling arm 12 is in vertical or non-signaling position, as shown in Fig. 1, the circuit through the electric lamp will be broken and hence said lamp not lighted. Upon downward rocking of said arm to horizontal or signaling position, the circuit therethrough will be automatically closed to effect lighting of said lamp. This provision is made for employment at night or at times when the signaling arm is not otherwise visible. A suitable switch 23 will also be interposed in the lamp circuit whereby said circuit may be broken during the day time when use of the lamp is not desired.

The device is designed for use particularly in connection with vehicles having closed bodies, and, in this case, the side of the body 24 adjacent the device will be formed with an elongated opening 25 through which the arm 12 is adapted to project. The opening thus formed will be very small, the length thereof being only sufficient to permit of the swing of the pivoted end of the signaling arm, the outer end or major portion of said arm being positioned exteriorly. To prevent any water dripping into the body of the vehicle along the arm 12, in case of rain, a rubber disk 26 is provided which will interrupt any water descending along arm 12 and will prevent entry of the same into the vehicle body, as will be readily understood.

With the construction thus set forth, it will be seen that a device is provided which may be readily and easily operated by the driver of the automobile in signaling to cars behind. With the construction set forth it will be seen that when it is desired to signal it is only necessary for the driver to engage the member 10 and press the same forwardly against the spring 13. When this is done, the member 10 is released from frictional engagement with the head 14 of stud 9, thus permitting of ready rocking of the signaling arm to horizontal or signaling position. After signaling, said arm may as readily be rocked upwardly to non-signaling position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vehicle signaling device comprising a supporting element; a stud on said supporting element; a hand wheel rotatably and shiftably mounted on said stud; a signaling arm secured to and projecting laterally from said hand wheel; an enlargement on said stud against which said hand wheel is adapted to engage; and resilient means for pressing said hand wheel against said enlargement for yieldingly holding said arm in positions of pivotal adjustment, substantially as described.

2. In a signaling device the combination with a vehicle having a closed body, said body having a slot in one side thereof, of a supporting element arranged at the front end of the vehicle; a rearwardly projecting stud on said supporting element positioned within said vehicle body; a hand wheel rotatably and shiftably mounted on said stud; a signaling arm secured to said hand wheel and projecting laterally therefrom through said slot; an enlargement on said stud at the rearward end thereof, against which said arm is adapted to engage; and resilient means for pressing said arm rearwardly against said enlargement, substantially as described.

In testimony whereof I have signed my name to this specification in the presence of two subscribing witnesses.

CARL O. KUEHNE.

Witnesses:
 JOSHUA R. H. POTTS,
 HELEN LILLIS.